Inventor:
ERNST RUTISHAUSER
By William H. Meagher
Attorney 3,466,574
DELAY LINES
Ernst Rutishauser, Spreitenbach, Switzerland, assignor to RCA Corporation, a corporation of Delaware
Filed Jan. 10, 1967, Ser. No. 608,329
Claims priority, application Great Britain, Jan. 21, 1966, 2,855/66; Nov. 16, 1966, 51,344/66
Int. Cl. H03h 9/30
U.S. Cl. 333—29 3 Claims

ABSTRACT OF THE DISCLOSURE

Delay line, suitable for use in luminance channel of a color television receiver, employs a delay line former of "flat" configuration (width-to-thickness ratio significantly greater than 1:1); flat conductive strip, deposited on one major surface of the former, is covered by a strip of dielectric material. Layer wound coil surrounds the flat former, overlying the covered conductive strip. Rectangular and oval cross-sectional contours for the flat former are disclosed.

Figure 1:
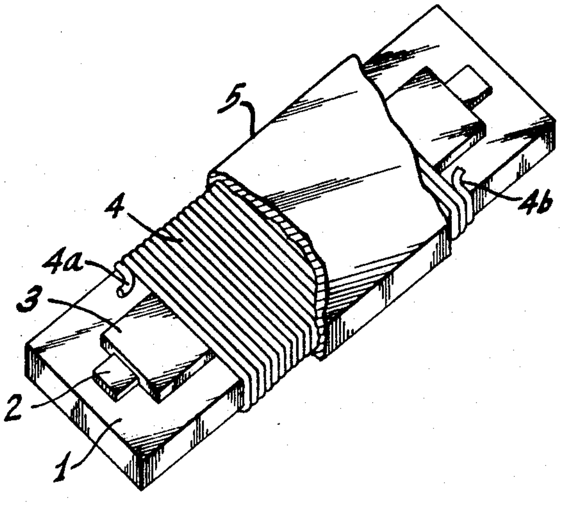

The present invention is directed to delay lines of a novel construction; an example of delay line use where significant advantage may be taken of this invention is the delay line conventionally required in the luminance channel of color television receivers used in systems such as NTSC or PAL.

In receivers for such color television systems, the signals to be used in controlling the color image reproducing device are desirably processed in two distinct channels, viz., the so-called luminance and chrominance channels. In the receiver's chrominance channel, a chrominance signal comprising side bands of a modulated color subcarrier wave is subject to amplification before demodulation. The amplification is frequency selective, using an amplifier of a bandpass character, in order to pass the chrominance signal to the relative exclusion of the low frequency components of the accompanying luminance signal. In contrast, the luminance channel, which passes the luminance signal representative of the variations in brightness or light intensity of the picture elements, is of a low pass character.

Due to its bandpass characteristic, the chrominance channel inherently introduces a greater delay of the signal information represented by the chrominance signal than is suffered by the counterpart brightness information in the low pass chrominance channel. Thus, it is desirable that some form of compensating delay be introduced in the luminance channel of the receiver in order that the brightness and coloring information arrive at the color image reproducing device with proper coincidence of timing. For this purpose the luminance channel conventionally employs a delay line that introduces a video signal delay of the order of a large fraction of a microsecond.

The present invention is concerned with a delay line structure, suitable for such luminance delay purposes, which is simple and relatively easy to manufacture, and yet provides highly desirable performance characteristics, such as relatively little change in delay versus input frequency over the luminance video band to be used, as well as a relatively flat output amplitude versus input band.

It has been found that these attributes may be obtained by using a physical configuration for the delay line which may be characterized as relatively "flat." In such a flat configuration, the delay line "former" (coil form) has a width to thickness ratio significantly greater than 1:1. This is in marked contrast with the cylindrical configuration of the luminance delay lines currently in widespread use in color television receivers in the United States.

In accordance with a particularly successful embodiment of the present invention, a simple flat conducting strip is laid along one side of the flat delay line former, the latter being of insulating material such as Bakelite. A flat strip of suitable dielectric material overlays the flat conductive strip. A coil of the straightforward layer type is wound about the delay line former, overlying the dielectric strip. With provision being made for input and output terminal connections to the respective ends of the coil and for a common or ground terminal connecting to the flat conducting strip, the entire assembly may then be encapsulated in an outer jacket of appropriate insulating material to provide the flat finished product.

Illustratively, a flat delay line, constructed as above-described, provided a nominal delay of 420 nanoseconds with less than a 20 nanosecond decrease in delay at the 5 megacycle end of the video band. This contrasts with a delay decrease at 5 megacycles of greater than 60 nanoseconds in a representative commercial delay line product of cylindrical configuration and of comparably simple construction, and with a delay decrease at 5 megacycles of greater than 30 nanoseconds for a commercial delay line product of a complex and expensive core delay cable nature (i.e., where an inner conductor comprises a coil wound on the magnetic core, and an outer conductor is spirally wound on a cylindrical dielectric enclosing the inner coil).

A primary object of the present invention is to provide a novel and improved delay line structure.

A further, particular object of the present invention is to provide a novel delay line of relatively simple construction, having operating characteristics suitable for achieving satisfactory performance as a luminance channel delay line in a color television receiver.

Figure 2:
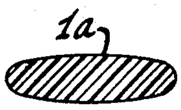

Other objects and advantages of the present invention will become readily apparent to those skilled in the art upon a reading of the following detailed description and an inspection of the accompanying drawing in which:

FIGURE 1 is a simplified, perspective drawing of a delay line constructed in accordance with an embodiment of the present invention, with the insulating jacket of the line partially broken away to expose the delay line former and other delay line elements; and FIGURE 2 is a cross-sectional view of a modification of the delay line formed of the FIGURE 1 embodiment.

In FIGURE 1 of the accompanying drawing, a simplified showing of an invention embodiment is provided, with the outer jacket broken away to provide a view of the enclosed elements. As shown therein, a flat conducting strip 2 is laid down on one side of a flat Bakelite former 1. Overlying all but the ends of the conductive strip 2 is a flat dielectric strip 3. A coil 4, of a simple layer wound variety, is wound about the former 1, the turns thereof extending over the flat conducting strip 2 in the central region thereof, where the dielectric strip 3 is interposed. (The thickness of elements 2, 3 and 4 are relatively exaggerated in FIGURE 1 to facilitate illustration.) The entire assembly is encapsulated in an outer jacket 5 of suitable insulating material.

Suitable terminal structure (not illustrated) of any convenient form may be provided at the ends of the delay line former 1 to permit input and output connections to the respective ends 4*a*, 4*b* of the coil 4, as well as a common or ground connection to the conductive strip 2. One form of terminal structure that has proved convenient to employ in making connections between the delay line elements and external circuitry simply involves looping leads (which extend to the exterior of jacket 5) through closely adjacent holes piercing the former 1; the delay line element is then connected to the thus anchored lead end.

In FIGURE 1, the delay line former 1 is illustrated as having a rectangular cross section. While satisfactory operation can be achieved with such a cross-sectional configuration for the former, it has been found that proper winding of coil 4 can be facilitated by departing from precise rectangularity and rather providing an essentially bi-radial cross-sectional configuration. Illustrative of this modification of the former structure of FIGURE 1 is the cross-sectional view of a flat former 1*a* provided in FIGURE 2. The rounding of the edges of the former and the slight convex bowing of the major flat surfaces thereof readily permit attainment of substantially uniform tension for all winding portions of coil 4 using simple coil winding apparatus.

It may be noted that pursuant to the principles of the invention, choice of the ratio of width to thickness of the delay line, and of associated structural parameters, permits selection of performance characteristics of highly satisfactory nature, without having to resort to expensive prior art expedients such as overlap coil windings and spiral conducting strips. Some illustrative examples of structural parameter choices and the electrical characteristics attained therewith are set forth in the table below (where $Z_0$ is the characteristic or surge impedance of the delay line, expressed in ohms, and $T_D$ is the nominal delay introduced by the line, expressed in microseconds):

| | | | |
|---|---|---|---|
| Delay line $Z_0$ | 4,500 | 5,700 | 6,900 |
| Delay line $T_D$ | 0.721 | 0.737 | 0.680 |
| Freq. for 10% reduction in delay, mc | 6.5 | 7.4 | 16 |
| Length of former, cm | 16 | 16 | 10 |
| Width of former, mm | 32 | 35 | 37 |
| Thickness of former, mm | 6.2 | 8.0 | 8.0 |
| Length of winding, cm | 15 | 14 | 14.2 |
| Wire used (Cu enam.), mm | 0.09 | 0.08 | 0.00 |
| No. of turns | 1,400 | 1,300 | 1,358 |
| Thickness of copper strip, mm | 0.1 | 0.1 | 0.1 |
| Width of copper strip, mm | 7 | 5 | 4 |
| Thickness of mylar dielectric, mm | 0.1 | 0.1 | 0.1 |
| Width of mylar dielectric, mm | 15 | 15 | 15 |

It will be seen that the delay line construction of the present invention has advantages of simplicity of design and ease of manufacturing. Dielectric material is required on only one surface of the delay line former. Printed circuit techniques may readily be employed in establishing the conductive strip element, as well as terminals for the coil element. Complex coil winding machinery is not required.

What is claimed is:

1. A delay line comprising a delay line former of insulating material and having a width to thickness ratio appreciably greater than 1:1 whereby said former has a substantially flat configuration, a single, thin, substantially flat, conductive strip disposed on a single substantially flat surface of said former, a thin, substantially flat strip of dielectric material overlying at least the central region of said conductive strip, said dielectric strip and said conductive strip being appreciably thinner than said former, and a coil layer wound about said former with the turns thereof extending over said conductive strip but separated therefrom by the material of said dielectric strip, said turns being disposed such that the portions thereof overlying said flat surface of said former extend throughout their length at a constant, substantially perpendicular angle with respect to the axis of said former.

2. A video signal delay device comprising the combination of:

an insulating member having a width to thickness ratio significantly greater than 1:1 and presenting a pair of elongated major surfaces on opposite faces thereof, a single, thin, conductive strip deposited on only one of said pair of major surfaces, a thin layer of dielectric material covering at least a portion of said conductive strip, and a coil layer wound about said member with the successive turns thereof overlying the covered conductive strip on said one surface, the thickness of said insulating member being significantly greater than the thickness of said strip and said layer.

3. A video signal delay device in accordance with claim 2 wherein said major surfaces of said insulating member are convexly bowed.

References Cited

UNITED STATES PATENTS 2,894,223 7/1959 Sinclair ............. 333—31

HERMAN KARL SAALBACH, Primary Examiner

T. VEZEAU, Assistant Examiner

U.S. Cl. X.R.

333—31

PO-1050
(5/69)

UNITED STATES PATENT OFFICE
CERTIFICATE OF CORRECTION

Patent No. 3,466,574 Dated September 9, 1969

Inventor(s) ERNST RUTISHAUSER

It is certified that error appears in the above-identified patent and that said Letters Patent are hereby corrected as shown below:

Column 1, line 63, before "band" insert --frequency response characteristic for the same video--.

Column 2, line 44, cancel "formed" and insert therefor -- former --.

In the table, column 3, lines 26-36, change table entries as follows:

Third line of table, third column of tabulations, cancel "16" and insert therefor -- 10 --.

Fourth line of table, third column of tabulations, cancel "10" and insert therefor -- 16 --.

Eighth line of table, third column of tabulations, cancel "0.00" and insert therefor -- 0.08 --.

Ninth line of table, third column of tabulations, cancel "1358" and insert therefor -- 1350 --.

SIGNED AND SEALED
SEP 22 1970

(SEAL)
Attest:

Edward M. Fletcher, Jr.
Attesting Officer

WILLIAM E. SCHUYLER, JR.
Commissioner of Patents